April 10, 1956 R. D. MEYERS 2,741,124
FUEL QUANTITY MEASURING APPARATUS
Filed Oct. 28, 1950

INVENTOR.
ROBERT D. MEYERS
BY
George H Fisher
ATTORNEY.

United States Patent Office 2,741,124
Patented Apr. 10, 1956

2,741,124

FUEL QUANTITY MEASURING APPARATUS

Robert D. Meyers, Minneapolis, Minn., assignor to Minneapolis-Honeywell Regulator Company, Minneapolis, Minn., a corporation of Delaware Application October 28, 1950, Serial No. 192,685

8 Claims. (Cl. 73—304)

This invention is concerned with capacitive type tank units for measuring the quantity of fuel in tanks such as are used in aircraft and is particularly concerned with tank units for measuring the quantity of fuel in tanks which do not have the same horizontal cross-section throughout their height. It is therefore an object of the present invention to design a new and improved tank unit which will accurately measure the quantity of fuel in a tank which varies in cross-sectional area at different levels of the tank.

Another object of the invention is to design a tank unit which is simple in design and construction and yet will accurately measure the quantity of fuel in tanks of varying cross-sectional area.

Another object of the invention is to design a tank unit which may be easily "tailored" to a particular tank of varying cross-sectional area so as to accurately measure the quantity of fuel in the tank.

Another object of the invention is to design a tank unit which may use standard tank units and with the simple addition of a single component be adapted to measure the amount of fuel in a tank of varying cross-sectional area.

A further object of the invention is to design a highly flexible tank unit which has a single basic design and which may be adapted to accurately measure the amount of fuel in a tank of varying cross-sectional area.

Another object of the invention is to design a tank unit in which the electrostatic field between the electrodes is controlled in accordance with the cross-sectional area of the tank.

It is yet another object of the invention to design a tank unit using standard electrodes with a further member being used to control the electrostatic field in accordance with the cross-sectional area of the tank.

A still further object of the invention is to design a tank unit using a shield to control the electrostatic field in accordance with the cross-sectional area of the tank.

The illustrative embodiment of the invention comprises a capacitive tank unit in which shielding is used to reduce the electrostatic field between the electrodes. The amount of shielding is determined by the horizontal cross-sectional area of the tank at various levels in order that the capacitance of the tank unit changes linearly with change in the amount of fuel in the tank.

Because the capacitance of the tank unit varies linearly with change in the amount of fuel in the tank the indicator which indicates the quantity of fuel in the tank may be calibrated linearly over the dial and need not be specially calibrated for the particular shape of the tank.

Also, because the capacitance of the tank unit varies linearly with change in the amount of fuel in the tank, a signal which varies linearly with the quantity of fuel can always be obtained from the bridge circuit into which the tank unit is connected. Because linear signals can be obtained, it is possible to add a number of signals from different tank units together to obtain a signal indicative of the total quantity of fuel in a number of tanks.

These and other objects and advantages will be better understood by a study of the following detailed description in conjunction with the accompanying drawings, in which.

Figure 1:
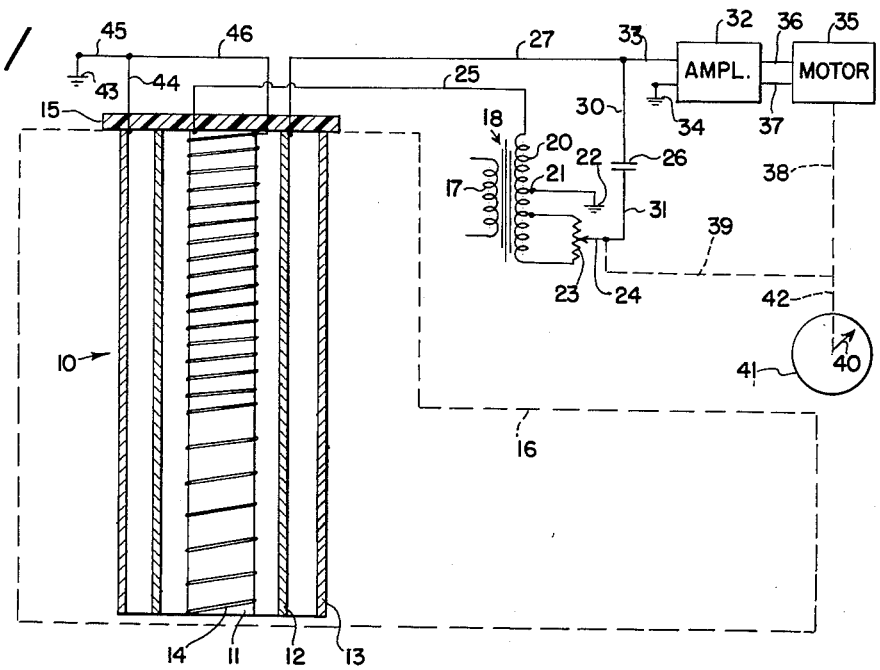
Figure 1 is a view, partially in section, of a tank unit connected into a circuit.

In Figure 1 the tank unit 10 comprises an inner electrode 11, an outer electrode 12 and a shield 13. Over the inner electrode is wound a wire 14. This wire is insulated from the inner electrode 11 by means of a coating of varnish or some other suitable insulating material on the inner electrode, or, perhaps, a varnish coating on the wire itself. An insulative plate 15 positions the various electrodes and shield symmetrically with respect to each other and further acts to attach the tank unit to the tank 16, which is shown schematically. The mounting of the various electrodes and shield with respect to each other and to the tank are shown only schematically as there are several well known methods for accomplishing these functions and the present invention does not lie therein.

Obviously, the comparative sizes of the tank 16 and the tank unit 10 would not be that as shown in the drawing, but rather the tank unit would fill a much smaller portion of the tank. The unit is shown out of proportion in the drawing merely to more clearly show the inventive details of the unit. Also, it is desirable to position the tank unit along the overall center of gravity line, if that is possible.

The tank unit 10 is connected into a bridge which is energized by a transformer 18 having a primary 17 connected to any convenient source of power, not shown. The transformer 18 also comprises a secondary 20 which has a center tap 21 connected to ground terminal 22. Across the lower portion of the transformer secondary 21 is connected a resistor 23 having a wiper arm 24 cooperating therewith.

The inner electrode 11 of the tank unit 10 is connected to the upper terminal of transformer secondary 20 by conductor 25. The outer electrode 12 is connected to one electrode of a capacitor 26 by conductors 27 and 30. The other electrode of capacitor 26 is connected to wiper arm 24 by conductor 31. One output terminal of this bridge is from between the connection between the outer electrode of tank unit 10 and capacitor 26. The other output terminal of the bridge is ground terminal 22. The junction of the tank unit 10 and the capacitor 26 is connected to the input of an amplifier 32 by conductor 33. The other input terminal of the amplifier 32 is connected to a ground terminal 34. The amplifier 32 is powered by any convenient source of power, not shown.

Amplifier 32 is connected to a motor 35 by conductors 36 and 37. The motor 35 may be of a well known type of alternating voltage motor having two windings. One of the windings is connected to a source of power while the other winding, known as the amplifier winding, is connected to the output of amplifier 32. The amplifier and motor combination may be of the type shown in Patent 2,423,534, assigned to the assignee of the present invention.

Motor 35 has a mechanical output connection 38 and 39 connected to the wiper arm 24, cooperating with resistor 23 in the bridge circuit.

When the bridge circuit is balanced, there is no output signal from the bridge to the amplifier and the amplifier is unenergized. There is thus no operation of the motor and no movement of the wiper arm 24 along resistor 23. When the bridge becomes unbalanced due to change in the amount of fuel in tank unit 10, a signal is fed from the bridge to the amplifier to energize the amplifier and to cause rotation of motor 35 in the proper direction to move wiper arm 24 along resistor 23 until the bridge is again balanced and the output signal is reduced to zero. It is necessary, of course, that amplifier 32 be capable of being selectively energized to produce an output signal from the amplifier to the motor of a first or opposite phase to cause proper rotation of the motor such that the bridge will become rebalanced.

Motor 35 is also connected to a pointer 40 of an indicator dial 41 by mechanical connections 38 and 42. It is thus possible for an observer to obtain an instantaneous reading of the amount of fuel in the tank. For this purpose, the indicator dial may be calibrated in terms of pounds of fuel.

Shield 13 is connected to ground terminal 43 by conductors 44 and 45. The wire 14 wound on inner electrode 11 is connected to ground terminal 43 through conductors 46 and 45.

The purpose of shield 13 is to eliminate any error in the signal from tank unit 10 due to noise resulting from stray radio frequency waves.

It is well known that the capacitance of a tank unit varies with rise and fall of the fuel in the tank. This is because of the change in the dielectric constant of the fluid between the electrodes. The dielectric constant of air is 1.0 while that of a representative fuel would be 2.0. Thus, with the tank full of this fuel, the capacitance of the tank unit would be twice the capacitance of the tank unit when the tank is empty. If the cross-sectional area of the tank changes it is desirable to have the capacitance per unit length change also in order that the capacitance of the tank unit changes linearly with change of fuel as it rises and falls in the tank. If the tank is irregular in shape, the level of the fuel as it is being used falls a greater distance for a given quantity of fuel used if the tank has a comparatively narrow cross-sectional area than if it has a large cross-sectional area. It is desirable then for the capacitance of the tank unit to not vary as much per unit length for the comparatively narrow portions of the tank as it does for the wider portions of the tank.

Wire 14 operates to reduce the electrostatic field between the electrodes 11 and 12. The wire 14 accomplishes this purpose in that by being grounded it acts as a block to a portion of the electrostatic field between the two electrodes by diverting a portion of the electrostatic field to ground and thus diverting that portion of the field from the measuring circuit. The other two capacitors are not in the measuring circuit and their capacitances do not affect the measuring circuit. The capacitance between the inner electrode 11 and the grounded wire 14 is across the upper half of the transformer secondary 20, as seen in the drawing and so merely loads the upper half of the transformer but is not included in the measuring circuit. The capacitance between the outer electrode 12 and the grounded wire 14 is across the input circuit of the amplifier 32. To the extent that the capacitor comprising wire 14 and outer electrode 12 is in the circuit, however, the voltage across the input circuit of amplifier 32 at balance does not vary and so change in capacitance of this capacitor with rise and fall of fuel in the tank does not affect the balance of the bridge circuit. The capacitance instead merely loads the input circuit of the amplifier but does not affect its sensitivity. Thus, the more turns per unit length of the wire along the electrode 11, the more the electrostatic field is reduced. Conversely, the farther apart the turns of wire 14 are along the inner electrode 11, the less the electrostatic field is reduced.

The tank 16 is shown to have a cross-sectional area over the lower half of its height of twice that of the cross-sectional area of the upper half. In order to give an accurate linear reading of the amount of fuel in the tank it is then necessary that the change in capacitance for rise and fall of fuel in the tank over the lower half of the tank unit 10 be twice as great as the change in capacitance over the upper half of the tank unit.

The fuel is permitted to rise and fall between the electrodes and between the outer electrode and shield 13 through the bottom of the tank unit. Air is permitted to enter and leave the spaces between the electrodes and between the outer electrode and shield by means of holes, not shown, in the top of the tank unit. The spacing of the turns of the wire 14 on the inner electrode 11 is shown only schematically. Actually the turns of wire would be much closer together in order to have a greater effect upon the electrostatic field between the electrodes. It is, of course, not essential that the lower half of the electrode 11 have the wire surrounding it in that the maximum change in capacitance per unit length is available only upon there being no turns of wire about the electrode. The turns of wire are shown throughout the entire length of the inner electrode, however, merely to show that it is possible to do so.

As shown in the drawing, the spacing between the wires changes abruptly when the cross-sectional area of the tank changes. This is because the cross-sectional area of the tank changes abruptly. If the change in cross-sectional area were to be gradual the change in the spacing between the turns of wire would, of course, also be gradual.

It is possible to use a standard type of tank unit such as those now known in the art and merely add to this tank unit the wire 14 wound about the inner electrode.

The spacing between the turns of wire can be determined experimentally in order that the change in capacitance per unit length would vary with change in the quantity of fuel in the tank. If the tank unit were calibrated experimentally rather than by calibrated values the causes of error due to determining the area of the wire can be eliminated without having to take them in account by calculations.

It is seen that a tank unit has been designed which is very simple in design and may even use tank units now known in the art. All that is required in the tank unit of Figure 1 is to add a wire wound about the inner electrode with the spacing of the wire being varied according to the cross-sectional area of the tank in order that the change in capacitance per unit length of the tank unit varies according to the cross-sectional area of the tank. This provides a truly accurate reading of the quantity of fuel in the tank without having to specially calibrate indicator dials or make other adjustments throughout the circuit.

Figure 2:
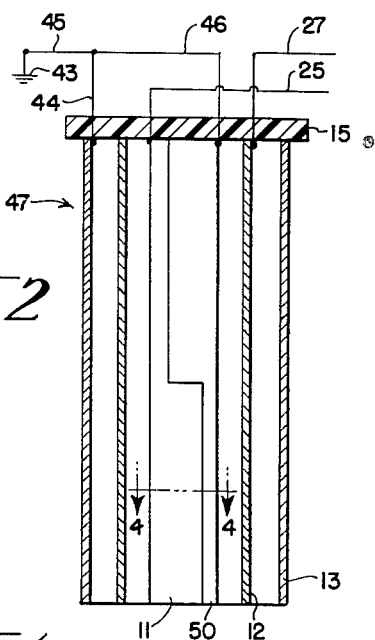
Figure 2 is a view, partially in section, of a modification of the tank unit.

The tank unit shown in Figure 2 may be substituted for the tank unit shown in Figure 1. In the tank unit 47 of Figure 2 the inner electrode 11, the outer electrode 12 and the shield 13, as well as the insulative cover 15, are all identical to those shown in the tank unit 10 of Figure 1 and so have the same numerical designation. In addition, the electrical connections from the various electrodes are the same as those shown in Figure 1.

Figure 4:
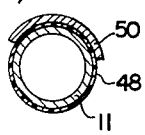
Figure 4 is a cross-sectional view of the inner electrode and shield of the modification of Figure 2 taken along line 4—4 in Figure 2.

The only difference in the two tank units is that in Figure 2 a conductive strip 50 is used instead of the wire 14. This may be better seen in Figure 4 which shows, somewhat thicker with respect to the other elements for better understanding of the relative positioning, the conductive strip 50 on the inner electrode 11. Figure 4 also clearly shows the varnish coating 48 on the inner electrode which electrically insulates the conductive strip 50 from the inner electrode. The conductive strip 50 is connected to ground terminal 43 through conductors 46 and 45. The conductive 50 serves to reduce the electrostatic field between the two electrodes 11 and 12 in the same manner as does wire 14.

Because a conductive strip is used rather than a wire it is possible to more closely calculate the effect upon the electrostatic field in that the area of the shielding conductive strip can be more closely determined. In order to reduce the maximum electrostatic field between the two electrodes by one half it is merely necessary to cover one half of the inner electrode with strip 50. The tank unit 47, as shown, is designed to be placed in a tank shaped as tank 16. It is, of course, not necessary that the strip 50 extend throughout the entire length of the inner electrode 11 but is merely shown that way for purposes of illustration. As shown, the strip 50 covers one third of the circumference of electrode 11 over its bottom half. It is thus necessary that the strip 50 cover two thirds of the total circumference of the electrode 11 throughout the top half. If the bottom half of inner electrode 11 were left completely uncovered the strip 50 would cover only half of the circumference of the top half of inner electrode 11. Here again, the portion of the inner electrode which should be covered by strip 50 may be determined experimentally.

Figure 3:
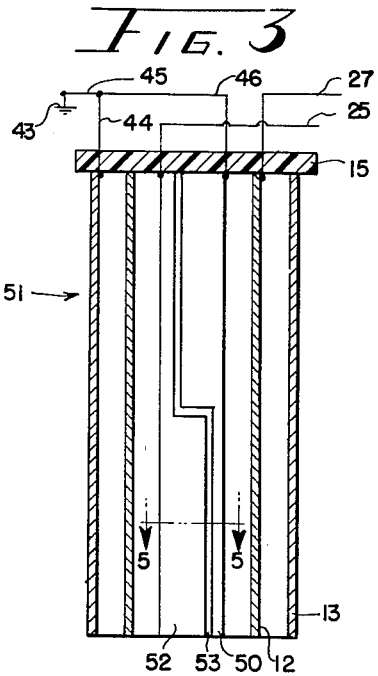
Figure 3 is a view, partially in section, of another modification of the tank unit.
Figure 5:
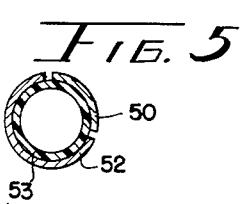
Figure 5 is a cross-sectional view of the inner electrode and shield of the modification of Figure 3 taken along line 5—5 in Figure 3.

The tank unit of Figure 3 is similar to the tank units of Figures 1 and 2 and may be placed in the circuit in place of either of them. The tank unit 51 shown in Figure 3, has the same outer electrode 12 and shield 13, as well as insulative plate 15 as shown in the tank units 10 and 47 of Figures 1 and 2. In tank unit 51, however, the inner electrode is a conductive strip 52 which is placed on an insulative core 53. The conductive strip 50 acting as a shield to reduce the electrostatic field between the two electrodes may be the same as that shown in Figure 2. A gap is provided between the conductive strips 52 and 50 to prevent any direct electrical connection between the two strips. The positioning of the two strips 52 and 50 with respect to each other and to the core 53 is shown in Figure 5, which is somewhat exaggerated for greater clarity. The strips could be formed by plating the core 53 and then cutting gaps to separate the plating into two parts, one of which would serve as the inner electrode 52 and the other as the shield strip 50. In operation the tank unit 51 is very similar to that of tank unit 47 insofar as calculating the effective capacitance is concerned.

The electrical connections from the tank unit 51 to the electrical circuit remain the same.

In the tank unit 51, shown in Figure 3, it is again possible to use a standard tank unit with the exception that in place of the standard inner electrode an insulative core or cylinder is used. The two conductive strips 50 and 52 are then placed on the core in any manner which will hold the strips to the core permanently.

It is seen that a tank unit has been designed which, while being very simple in design, is nevertheless capable of measuring the quantity of fuel in a fuel tank of any shape with a high degree of accuracy. Obviously, modifications may be made by those skilled in the art without departing from the spirit of the invention and it is therefore intended that the scope of the invention be limited only to the extent of the appended claims.

I claim as my invention:

1. Apparatus for measuring the quantity of a substance in a container of varying horizontal cross-sectional area comprising: a capacitor adapted to be positioned vertically in the container and having a first electrode, a second electrode and a conductive member, the capacitance of the capacitor varying with change in quantity of the substance; a transformer secondary comprising a source of power; an amplifier; motor means; indicating means; a fixed capacitor having a first electrode and a second electrode; means connecting one electrode of the first capacitor to a first end of the transformer secondary; means connecting one electrode of the fixed capacitor near the second end of the transformer secondary; means connecting the other electrodes of the capacitors together and to the amplifier; means connecting a center-tap of the transformer secondary and the amplifier to a source of reference potential; means connecting the motor means to said amplifier to cause operation of said motor means upon the potential of the connection between the two capacitors not being at the reference potential; means connecting said motor means near said second end of said transformer secondary to control the potential across said fixed capacitor; means connecting said conductive member of the first capacitor to the reference potential to limit the extent of the dielectric field between the electrodes of the first capacitor, the shape of the conductive member being such that the capacitance along the length of the capacitor corresponds to the cross-sectional area of the container; and means connecting said motor means to said indicating means to cause operation of said indicating means upon operation of said motor means and provide an indication of the quantity of the substance in the container.

2. A capacitor for measuring the quantity of a substance in a container of varying horizontal cross-sectional area comprising: a first conductive cylinder adapted to be positioned vertically in the container and comprising a first electrode; a second conductive cylinder symmetrically positioned within said first cylinder and comprising a second electrode; and a conductive strip wound about said second cylinder and insulated therefrom for reducing the electrostatic field between the electrodes along their length, the pitch of said strip varying per unit length of the capacitor depending upon the cross-sectional area of the container such that the electrostatic field between the electrodes varies linearly per unit length with the horizontal cross-sectional area of the container.

3. Apparatus for measuring the quantity of a substance in a container of varying horizontal cross-sectional area comprising: an electrical bridge circuit having a reference terminal and a pair of terminals in one arm thereof, a conductive cylinder adapted to be positioned in the container and comprising a first capacitor electrode, means connecting said cylinder to one of said pair of terminals; a first conductive member comprising a second capacitor electrode, means connecting said first conductive member to the other of said pair of terminals; a second conductive member arranged in controlling relation to said electrodes for reducing the electrostatic field between the electrodes along their length, and means connecting said second conductive member to said reference terminal, said first and second members being positioned within said cylinder to substantially describe a cylinder symmetrical with respect to said first electrode, said second member being insulated from said first member, the effective area of said first member varying per unit length of the capacitor depending upon the horizontal cross-sectional area of the container such that the electrostatic field between the electrodes varies linearly per unit length with the cross-sectional area of the container.

4. Apparatus for measuring the quantity of dielectric substance in a container of varying cross-sectional area, comprising: a capacitor adapted to be positioned in the container and having a first capacitor electrode in the form of a cylindrical conductive surface, a second electrode in the form of at least a portion of a cylindrical conductive surface positioned within said first capacitor electrode, and a conductive member insulated from said first and second capacitor electrodes and positioned relative thereto to control the electrostatic field between said first and second capacitor electrodes and forming capacitors with each of said first and second electrodes, the effective coacting surfaces of said first and second capacitor electrodes varying as a function of the varying cross-sectional area of the container; a measuring circuit having first and second signal input terminals, a source of voltage having a terminal and a point of reference voltage, means connecting one of said first or second capacitor electrodes to said first signal input terminal, means connecting the other of said first or second capacitor electrodes to said source of voltage at said terminal, means connecting the second signal input terminal to said source of voltage at the point of reference voltage to thereby provide a signal input voltage to said input terminals, and means connecting said conductive member to said source of voltage at the point of reference voltage, to thereby connect the capacitors formed by said conductive member and said capacitor electrodes across said input terminals and across the terminal and reference voltage point of said source of voltage.

5. A characterized capacitor for use with an electrical circuit for measuring the quantity of dielectric substance in a container having a varying cross-sectional area, comprising: a first conductive cylindrically shaped capacitor electrode, means for connecting said capacitor electrode to the electrical circuit, a second conductive cylindrically shaped capacitor electrode positioned within but insulated from said first capacitor electrode, means for connecting said second capacitor electrode to the electrical circuit, a conductive shielding member of varying area positioned on said second capacitor electrode but insulated therefrom for controlling the effective relative areas of said first and second capacitor electrodes to thereby control the electrostatic field therebetween, said conductive shielding member having a varying area which is related to the variations in cross-sectional area of the container, and means for connecting said conductive shielding member to the electrical circuit.

6. A characterized capacitive type measuring system for fuel tanks comprising: an electrical network having a measuring portion including a pair of terminals and a reference potential terminal; a first electrode, means connecting said first electrode to a first terminal of the measuring portion of said network; a second electrode substantially coextensive in length with said first electrode and spaced therefrom, means connecting said second electrode to a second terminal of the measuring portion of said network; and a shielding member of electrically conductive material substantially coextensive in length with said first and second electrodes and electrically insulated from said first and second electrodes, said shielding member being positioned to control the electrostatic field between said electrodes, means connecting said shielding member to the reference potential terminal of said network to reduce the electrostatic field between said electrodes, said shielding member being dimensionally shaped to give a desired characterization to the measuring system.

7. Apparatus for measuring the quantity of a substance in a container of varying horizontal cross-sectional area comprising: a source of voltage; voltage responsive means; a conductive cylinder adapted to be positioned in the container and comprising a first capacitor electrode; a conductive member shaped to form at least a portion of a cylinder and positioned within said conductive cylinder and insulated therefrom, said conductive member comprising a second capacitor electrode; means connecting said source of voltage, said voltage responsive means, and said first and second capacitor electrodes in a series circuit; another conductive member so positioned relative to said first and second capacitor electrodes as to reduce the electrostatic field between the electrodes along their length; and means connecting the second named conductive member to the series circuit at the connection of said source of voltage and said voltage responsive means, said second named conductive member being shaped to vary in effective area per unit length of the capacitor depending upon the horizontal cross-sectional area of the container such that the electrostatic field between the electrodes varies linearly per unit length with the horizontal cross-sectional area of the container.

8. Apparatus for measuring the quantity of dielectric substance in a container having a varying cross-sectional area, comprising: a source of voltage having a pair of terminals one of which is connected to a reference point, voltage responsive means having a pair of terminals one of which is connected to the reference point, a conductive cylinder forming a first capacitor electrode, a conductive member positioned within said conductive cylinder but insulated therefrom and comprising a second capacitor electrode, said second electrode being shaped to form a portion of a cylinder and having a shape which varies as a function of the cross-sectional area of the container, means connecting said first and second electrodes one to each of the second of said pair of terminals of said source of voltage and said voltage responsive means, another conductive member positioned within said conductive cylinder but insulated from said conductive cylinder and the second electrode, and means connecting said other conductive member to the reference point, said other conductive member being arranged relative to said conductive cylinder and said second electrode to control the electrostatic field between said conductive cylinder and the second electrode.

References Cited in the file of this patent

UNITED STATES PATENTS

| | | |
|---|---|---|
| 1,715,319 | Houck | May 28, 1929 |
| 2,540,658 | De Giers | Feb. 6, 1951 |
| 2,544,012 | Edelman | Mar. 6, 1951 |
| 2,582,399 | Smith | Jan. 15, 1952 |
| 2,699,523 | Meyers | Jan. 11, 1955 |

FOREIGN PATENTS

| | | |
|---|---|---|
| 207,649 | Great Britain | Dec. 6, 1923 |
| 938,682 | France | Apr. 12, 1948 |

OTHER REFERENCES

RCA Receiving Tube Manual, Technical Series RC 14, pp. 7, 14 and 15, 1940.

Electronics, vol. 23, No. 4 April 1950, pp. 77–79.